(12) United States Patent
Konno et al.

(10) Patent No.: US 8,411,222 B2
(45) Date of Patent: Apr. 2, 2013

(54) LIQUID CRYSTAL DISPLAY DEVICE AND VIDEO DISPLAY DEVICE USING THE SAME

(75) Inventors: Akitoyo Konno, Hitachi (JP); Hiroshi Sasaki, Mito (JP); Katsunari Sato, Toda (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 810 days.

(21) Appl. No.: 12/541,998

(22) Filed: Aug. 17, 2009

(65) Prior Publication Data

US 2010/0073582 A1 Mar. 25, 2010

(30) Foreign Application Priority Data

Sep. 19, 2008 (JP) ................................. 2008-240167

(51) Int. Cl.
G02F 1/1333 (2006.01)
G02F 1/1335 (2006.01)

(52) U.S. Cl. .......................................... 349/58; 349/65

(58) Field of Classification Search .................... 349/58, 349/65

See application file for complete search history.

(56) References Cited

U.S. PATENT DOCUMENTS 6,020,867 A * 2/2000 Shimada et al. ................ 345/87
2002/0012243 A1 * 1/2002 Matsushita ..................... 362/31

FOREIGN PATENT DOCUMENTS

| JP | 06-342603 | 12/1994 |
| JP | 08-064021 | 3/1996 |
| JP | 09-211450 | 8/1997 |
| JP | 2004-233811 | 8/2004 |
| JP | 2006-235653 | 9/2006 |
| JP | 2008-299181 | 12/2008 |
| JP | 2008299181 A * | 12/2008 |
| WO | WO 2008/096482 | 8/2008 |

* cited by examiner

*Primary Examiner* — Mike Qi
(74) *Attorney, Agent, or Firm* — Antonelli, Terry, Stout & Kraus, LLP.

(57) ABSTRACT

In a liquid crystal display device and a video display device using the same, for suppressing light unevenness at the end of a display region, the video display device is provided with a liquid crystal display device and a housing configured to support the liquid crystal display device, wherein the liquid crystal display device includes a liquid crystal panel, a first frame and a liquid crystal support member which interpose the liquid crystal panel therebetween, a light guide plate which is disposed at the liquid crystal support member on a side opposite to a side where the liquid crystal panel is disposed, and a light source which is disposed at a side surface of the light guide plate, and wherein a cushion member is disposed between the liquid crystal support member and the light guide plate.

8 Claims, 8 Drawing Sheets

LIQUID CRYSTAL DISPLAY DEVICE AND VIDEO DISPLAY DEVICE USING THE SAME

FIELD OF THE INVENTION

The present invention relates to a liquid crystal display device and a video display device using the same.

DESCRIPTION OF RELATED ART

A video display device is generally classified into a luminous video display device, such as a CRT (Cathode Ray Tube), a plasma display panel, or the like, and a non-luminous video display device, such as a liquid crystal display device, or the like. As the non-luminous video display device, there are a device in which a reflection type optical modulation element is used to adjust an amount of reflected light according to an image signal, and a device in which a transmissive optical modulation element is used to adjust an amount of transmitted light according to the image signal. In particular, the liquid crystal display device which uses a liquid crystal display panel as the transmissive optical modulation element and is provided with an illuminating device (also refer to as a backlight) on a rear surface thereof is thin and lightweight. Therefore, the liquid crystal display device is adopted for various video display devices, such as a monitor of a computer, a television receiver, or the like.

As the principles of displaying in the liquid crystal panel, in addition to TN (Twisted Nematic), IPS (In-Plane Switching) characterized by a wide viewing angle, MVA (Multi-domain Vertical Alignment), and so on are adopted, but all of them emit light from a backlight provided on a rear surface of a display unit and control a transmittance of the light emitted from the backlight to form an image on the liquid crystal panel.

In recent years, a high brightness and the enlargement of a color reproducible range are increasingly required for the video display device provided with the liquid crystal display devices. In addition, as a thin-screen TV and a portable display device are widely used, a need of an ultra thin-screen type excellent in design is increased. In order to accelerate the liquid crystal display device to be thinner, an edge light type is proposed in which a light source of the backlight is disposed at the edge instead of being positioned on the rear surface of the liquid crystal panel. For example, in JP-A-2004-233811, a technique of an edge light type illuminating device is disclosed in which the light source is disposed so as to emit light on the side surface of the light guide plate.

In the known technique, the brightness in the vicinity of the end of a light emitting region of the light guide plate is increased compared with a required brightness. That is, light unevenness may occur at the end of a display region. An occurrence reason of the light unevenness at the end of the display region will be described with reference to FIGS. 10 and 11. FIGS. 10 and 11 are cross-sectional views illustrating a liquid crystal display device.

As shown in FIG. 10, a gap is generated between a light guide plate 9 and a liquid crystal support member 5. The light guide plate 9 is fixed between the liquid crystal support member 5 having a certain degree of rigidity and a frame. Here, since the light guide plate 9 and the liquid crystal support member 5 are hard members mainly formed of resin material, a gap may be generated between contact portions of the light guide plate 9 and the liquid crystal support member 5 due to a dimension tolerance, thermal deformation, or the like of the members. Additionally, in view of the deflection caused by the thermal deformation of the light guide plate 9, it is difficult to bring the light source 14 into contact with the light guide plate 9, and thus there is a need for a certain amount of a space. Therefore, the light emitted from the light source 14 leaks in the light emitting region through the gap between the light guide plate 9 and the liquid crystal support member 5, so that the light unevenness may occur at the end of the display region (refer to a dotted portion in FIG. 10). In addition, when the light guide plate 9 and the liquid crystal support member 5 are extremely pressed to each other, there may be a problem that the members are scratched by being rubbed against each other while repeating expansion and contraction due to heat. Therefore, they must come into contact with each other at a proper pressing force.

In addition, as shown in FIG. 11, when an upper reflection sheet 21 is disposed between the liquid crystal support member and the light guide plate 9, the light is scattered and reflected on the boundary portion of the light emitting region of the light guide plate 9 facing the upper reflection sheet 21, and the light is further scattered and reflected on the lower reflection sheet 10 to be emitted from the light guide plate 9, so that the light unevenness is generated at the end of the display region (refer to a dotted portion in FIG. 11).

BRIEF SUMMARY OF THE INVENTION

An object of the present invention is to provide a liquid display device and a video display device using the same which can suppress light unevenness at the end of a display region.

In order to solve the above-mentioned problem, according to an aspect of the present invention, there is provided a video display device including a liquid crystal display device; and a housing configured to support the liquid crystal display device, wherein the liquid crystal display device includes a liquid crystal panel, a first frame and a liquid crystal support member which interpose the liquid crystal panel therebetween, a light guide plate which is disposed at the liquid crystal support member on a side opposite to the side where the liquid crystal panel is disposed, and a light source which is disposed at a side surface of the light guide plate, and wherein a cushion member is disposed between the liquid crystal support member and the light guide plate.

In addition, according to another aspect of the present invention, there is provided a video display device including a liquid crystal display device; and a housing configured to support the liquid crystal display device, wherein the liquid crystal display device includes a liquid crystal panel, a first frame and a liquid crystal support member which interpose the liquid crystal panel therebetween, a light guide plate which is disposed at the liquid crystal support member on a side opposite to the side where the liquid crystal panel is disposed, a light source which is disposed at a side surface of the light guide plate, a second frame which is disposed at the light guide plate on a side opposite to the side where the liquid crystal support member is disposed, a lower reflection sheet which is disposed between the light guide plate and the second frame, and an upper reflection sheet which is disposed between the liquid crystal support member and the light guide plate, and wherein a light absorption layer is disposed between the upper reflection sheet and the light guide plate.

According to the present invention, it is possible to provide the liquid crystal display device and the video display device using the same, which can suppress the light unevenness at the end of the display region.

Other objects, features and advantages of the invention will become apparent from the following description of the embodiments of the invention taken in conjunction with the accompanying drawings.

BRIEF DESCRIPTION OF SEVERAL VIEWS OF DRAWING

DETAILED DESCRIPTION OF THE INVENTION

Hereinafter, embodiments according to the present invention will be described in detail with reference to the accompanying drawings.

First Embodiment

Figure 1:
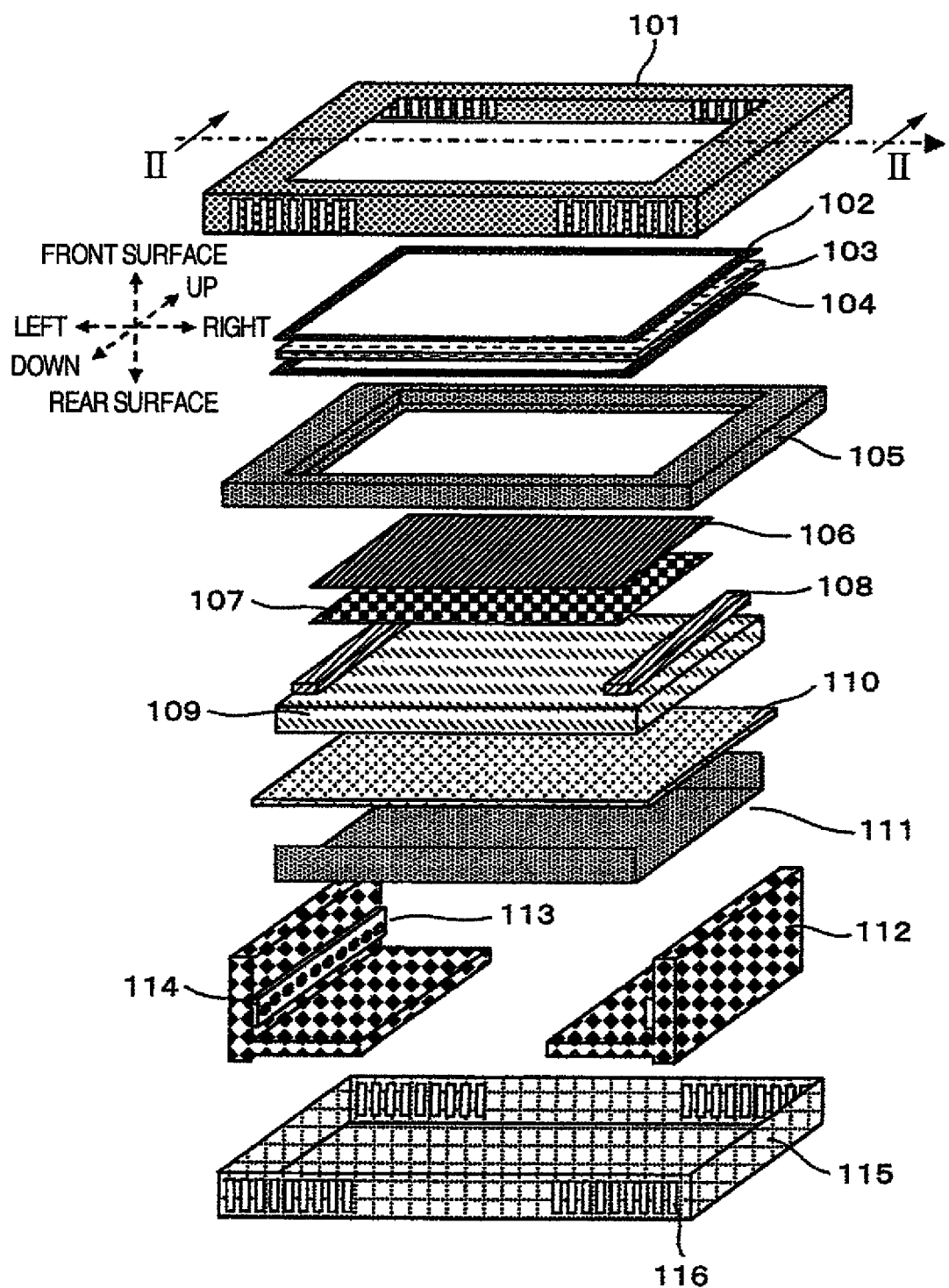
FIG. 1 is a perspective view illustrating a configuration according to a first embodiment of the present invention.

FIG. 1 is a perspective view illustrating a liquid crystal display device according to a first embodiment of the invention. As shown in FIG. 1, vertical and horizontal directions, and front and rear surfaces are defined on the basis of a display screen of a liquid crystal panel 103 in the present embodiment. The liquid crystal display device according to the present embodiment is provided with a first frame 101, a first rubber cushion 102, a liquid crystal panel 103, a second rubber cushion 104, a liquid crystal support member 105, a first optical sheet 106, a second optical sheet 107, a cushion member 108, a light guide plate 109, a lower reflection sheet 110, a second frame 111, a heat sink 112, a light source mounting substrate 113, a light source 114, and a rear surface cover 115. The light guide plate 109 is disposed on the rear surface of the liquid crystal panel 103. The light source mounting substrate 113 is disposed on either side surface of the light guide plate 109. A plurality of light sources 114 is mounted on the light source mounting substrate 113 in the vertical direction. The heat sink 112 is connected with a surface having no light source on the light source mounting substrate 113 using a thermal-conductive adhesion member. The rear surface cover 115 is disposed on the rear surface of the heat sink 112. The heat sink 112 is made of a material, such as copper, aluminum, or the like which is excellent in thermal conductivity, and serves to radiate heat of the light source 114 with efficiency. A ventilation opening 116 is provided at the lower surface of the rear surface cover 115 for inhalation and at the upper surface of the rear surface cover 115 for evacuation.

Figure 2:
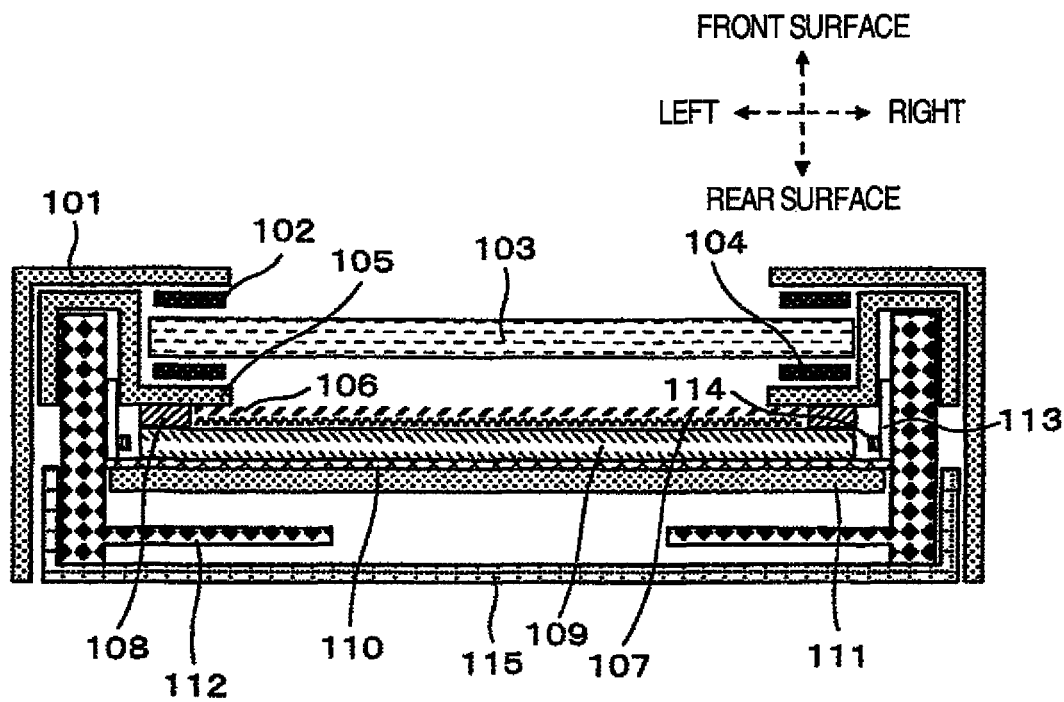
FIG. 2 is a cross-sectional view taken along the line II-II of FIG. 1, illustrating a configuration according to the first embodiment of the present invention.

FIG. 2 is a cross-sectional view taken along the line II-II of FIG. 1. As shown in FIG. 2, a space is provided between the second frame 111 and the rear surface cover 115, and the heat sink 112 extends in the space. There are spaces in the front surface and the rear surface of the heat sink 112, respectively. The heat propagated from the light source 114 is radiated by flowing of air in the spaces. The light source 114 serves to emit the light for displaying. The light source mounting substrate 113 is made of a ceramic substrate, which mounts the light source 114 and applies a current and a voltage to the light source 114 through a wiring pattern which is formed on the light source mounting substrate 113. In addition, the light source mounting substrate 113 serves as a reflection plate at the same time for capturing the light emitted from the light source 114 to the light guide plate 109 with efficiency. In addition, in the light source mounting substrate 113, the heat generated at the light source 114 can be easily transmitted to the outside by using a low thermal resistance ceramic material of the substrate 113.

Figure 3:
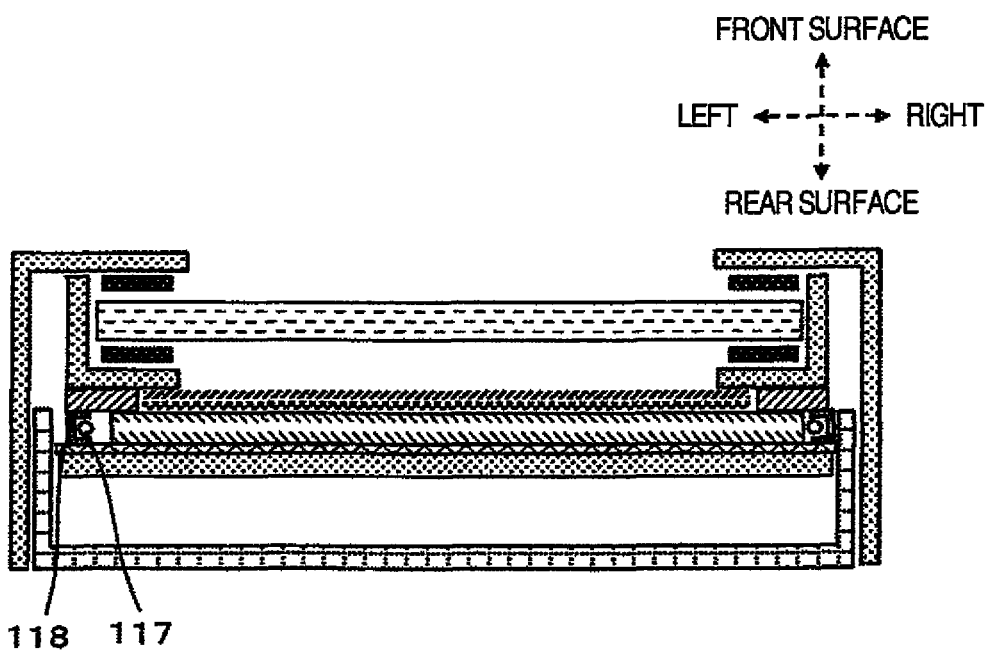
FIG. 3 is a cross-sectional view corresponding to FIG. 2, illustrating a configuration of a modified example of the first embodiment of the present invention.

In FIG. 1, an LED is used as the light source. In a case where a white LED is applied, light use efficiency can be increased. Further, in a case where red, green, and blue LEDs are applied, it is possible to widen a color reproducible range. On the other hand, as shown in FIG. 3, a fluorescent tube 117 may be used as the light source. In this case, the light source which is inexpensive and is easy to be mounted can be used. When the fluorescent tube 117 is used, in order to capture the output light from the fluorescent tube 117 to the light guide plate 109 with efficiency, a reflector (reflection plate) 118 is disposed such that the fluorescent tube 117 is surrounded.

The light guide plate 109 is made of a transparent resin such as an acrylate resin, which serves to convert the light emitted from the light source 114 into a surface light source. The light incident into the light guide plate 109 is reflected totally and propagated into the light guide plate 109, which is scattered by a reflection dot (not shown) printed on the lower surface of the light guide plate 109 to be taken out toward the upper surface of the light guide plate 109.

The liquid crystal panel 103 is configured such that the liquid crystal is interposed between two substrates, which serves as an optical shutter for controlling transmission or interception of the light emitted from the light guide plate 109 by switching ON/OFF in the liquid crystal.

The rear surface cover 115 is made of a resin, which serves as a protective cover for protecting the rear surface of the liquid crystal display device.

The first frame 101 is disposed on the front surface of the liquid crystal panel 103, which serves as a front cover of the liquid crystal display device. In addition, the first frame 101 is formed such that the display area of the liquid crystal display device is opened. For example, the first frame 101 includes a metal plate such as stainless steel, iron, aluminum or the like.

The first rubber cushion 102 is disposed at the front surface of the liquid crystal panel 103, which serves as a support member for supporting the first frame 101 and the liquid crystal panel 103. The second rubber cushion 104 is disposed at the rear surface of the liquid crystal panel 103, which serves as a cushion material for the liquid crystal panel 103 and the liquid crystal support member 105.

The liquid crystal support member 105 serves to support the liquid crystal panel 103, and serves as a heat insulating material which is interposed between the heat sink 112 and the liquid crystal panel 103 so as not to transmit the heat from the heat sink 112 to the liquid crystal panel 103. For example, the liquid crystal support member 105 includes a plastic material such as polycarbonate.

The first optical sheet 106 and the second optical sheet 107 are disposed at the front surface of the light guide plate 109, which serves to uniform the light emitted from the light guide plate 109 in the plane or to give directivity for increasing the brightness in the front surface direction. For example, the first optical sheet 106 includes a diffusion sheet for achieving the uniformity of the light. In addition, the second optical sheet 107 includes a prism sheet for increasing the brightness in the front surface by facing the light emitted from the light guide plate 109 in the front surface direction. In this case, the present invention is not limited to the above-mentioned configuration, and a reflective polarizer film or the like may be used in other cases. In addition, in the present embodiment, two optical sheets are used, but a configuration adopting one or three optical sheets may be considered according to applications.

The lower reflection sheet 110 is disposed at the rear surface of the light guide plate 109. The lower reflection sheet 110 reflects the light which is not directly incident into the light guide plate 109 of the light emitted from the light source 114 to enter the light into the light guide plate 109, and thus serves to increase the light use efficiency, and serves to return the light which is not matched up to the condition of the total reflection and emitted to the lower surface of the light guide plate 109, to the light guide plate 109.

The heat sink 112 accommodates the liquid crystal panel 103 and the light guide plate 109 in a virtual rectangular parallelepiped region which is circumscribed by the heat sink 112, and thus serves to protect the liquid crystal panel 103 and the light guide plate 109 when the liquid crystal display device is loaded. The heat sink 112 is disposed between the second frame 111 and the rear surface cover 115, and a space is formed between the second frame 111 and the rear surface cover 115. The heat generated at the light source 114 is diffused to the heat sink 112 on the rear surface of the second frame 111 in the surface direction, and then is radiated to the air flowing between the second frame 111 and the rear surface cover 115. The air flowing between the second frame 111 and the rear surface cover 115 flows from bottom to top by the natural convection to be discharged through the ventilation opening 116 which is formed on the rear surface cover 115.

The cushion member 108 is disposed between the liquid crystal support member 105 and the light guide plate 109. The light guide plate 109 is supported by receiving the pressing force from the liquid crystal support member 105 via the cushion member 108. Since the cushion member 108 is made of an elastic material, the gap between the light guide plate 109 and the liquid crystal support member 105 which is generated due to the thermal deformation is closed, so that it is possible to prevent the light from leakage. For example, such a cushion member 108 includes (1) an acrylate resin material of which the carbon number of the side chain is four or more, (2) a material which is made by adding a plasticizer made of dibutyl phthalate or the like to an acrylate resin having one to three of the carbon number of the side chain, or (3) a chloroprene rubber, a silicon rubber, or fluorine series rubber which are excellent in the heat resistance and the weather resistance.

In addition, by making the cushion member 108 of a high reflection material, the light from the light source 114 is absorbed into the cushion member 108 to be able to suppress lowering of the light use efficiency. For example, such a cushion member 108 includes (1) a mixture of a white resin and powder which is made by adding a white powder such as magnesium oxide, titanium oxide, or barium titanate to a material which is made by adding the plasticizer made of dibutyl phthalate or the like to the acrylate resin having four or more of the carbon number of the side chain or to the acrylate resin having one to three of the carbon number of the side chain, or (2) a mixture of a white rubber and powder which is made by adding a white powder such as magnesium oxide, titanium oxide, or barium titanate to the chloroprene rubber, the silicon rubber, or the fluorine series rubber. Further, since the light is emitted from the light source 114 to the cushion member 108, a crystalline type of the titanium oxide material is preferably a rutile type which does not have a photocatalytic action.

In addition, in the large-sized video display device of the edge light LED type in TV applications, since the light sources 114 are disposed densely, the heat generation of the light sources 114 is increased, and the temperature of the light guide plate 109 is also increased. As a result, the light guide plate 109 is repeatedly expanded and contracted due to heat, and thus the light guide plate 109 and the cushion member 108 are rubbed with each other, which makes the light guide plate 109 to be bended. Therefore, the cushion member 108 is made by using a member with a low friction coefficient which has a hock-absorbing property and a slipping property at the same time, so that it is possible to prevent the light guide plate 109 from being scratched. For example, such the cushion member 108 includes the porous material which is made of the hydrocarbon series resin, such as a polypropylene resin, or a polyethylene resin. In addition, by depositing aluminum on the surface of the porous material made of a hydrocarbon series resin, such as the polypropylene resin, or the polyethylene resin, in particular, the surface contacting with the light guide plate, it makes the cushion member 108 to have the high reflection ratio as well as the slipping property.

Figure 4:
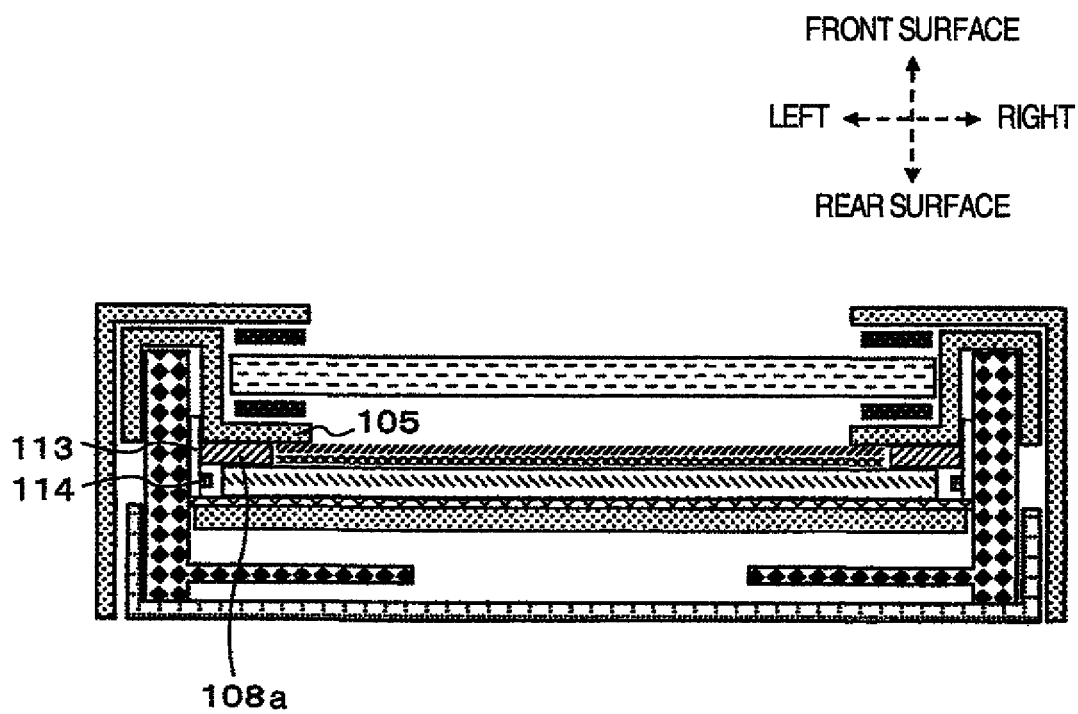
FIG. 4 is a cross-sectional view corresponding to FIG. 2, illustrating a configuration of another modified example of the first embodiment.

As shown in FIG. 4, the cushion member 108a is disposed so as to come into contact with the light source mounting substrate 113 as another configuration of the cushion member 108. With this configuration, it can be suppressed that the light from the light source 114 is absorbed into the liquid crystal support member 105. Here, in order to reuse the light reflected on the cushion member 108a, it is preferable that the reflection ratio of the cushion member 108a is 80% or more.

Figure 5:
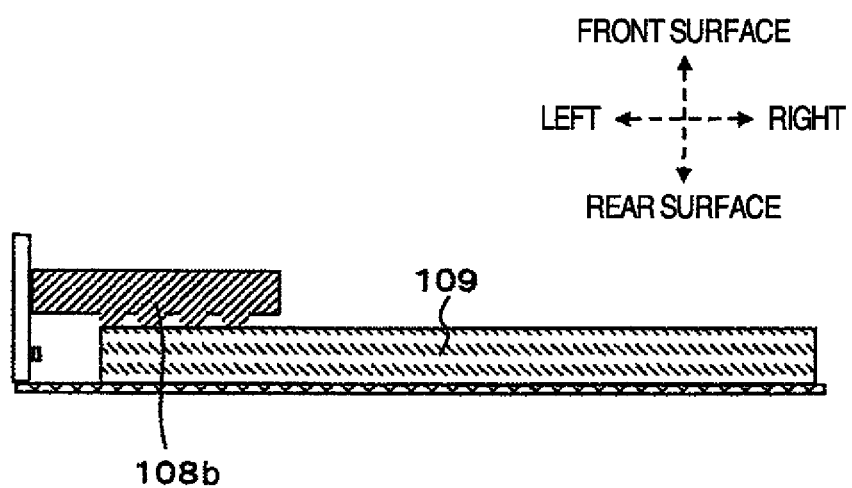
FIG. 5 is a cross-sectional view illustrating a modified example of a cushion member of the first embodiment.

As shown in FIG. 5, as another configuration of the cushion member 108, the surface of the cushion member 108b on which the cushion member 108b comes into contact with the light guide plate 109 is formed in an irregular shape. Therefore, the contact area between the cushion member 108b and the light guide plate 109 is reduced, and thus frictional force therebetween is reduced, so that it is possible to increase the sliding property as a result. In addition, since the contact area between the cushion member 108b and the light guide plate 109 can be more reduced by contriving to sharpen the tips in the protruded portions of the cushion member 108b, it is possible to increase the slipping property further more.

Figure 6:
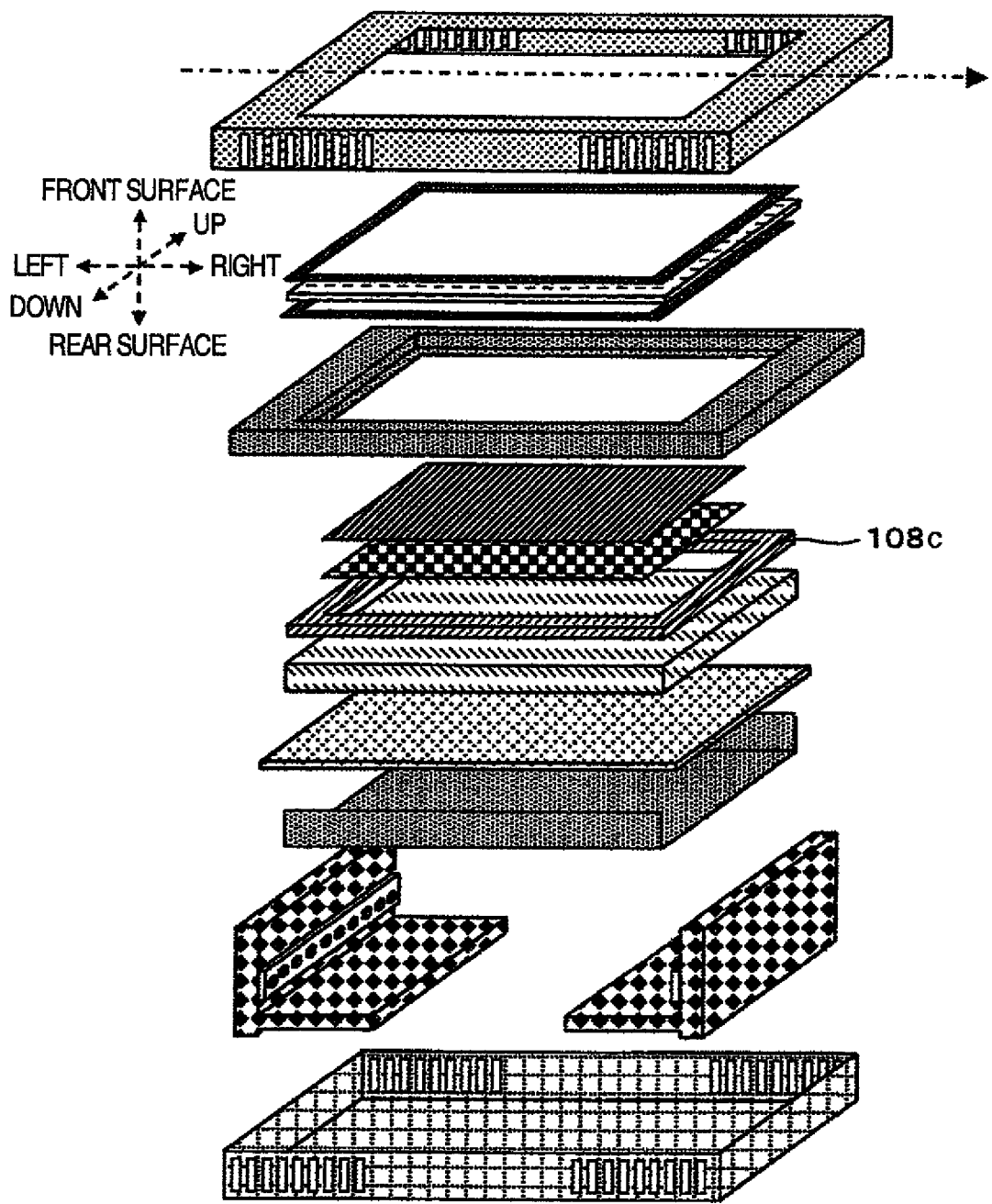
FIG. 6 is a perspective view illustrating another modified example of the cushion member of the first embodiment.

In FIG. 1, the cushion member 108 is disposed in the arrangement direction of the light source 114. However, as shown in FIG. 6, by making the cushion member 108d to be a frame shape, it is possible to prevent the light from leakage in horizontal and vertical directions in addition to the arrangement direction of the light source 114.

Figure 7:
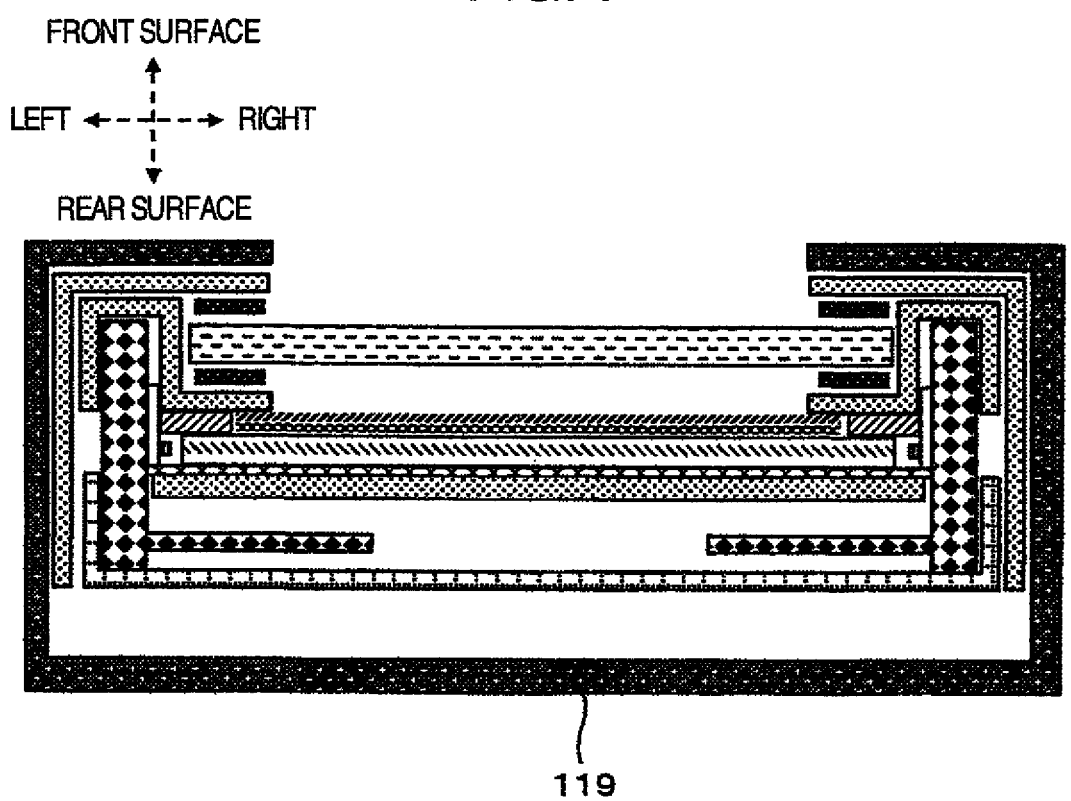
FIG. 7 is a cross-sectional view illustrating a configuration in which a liquid crystal display device according to the first embodiment of the present invention is applied to a video display device.
Figure 8:
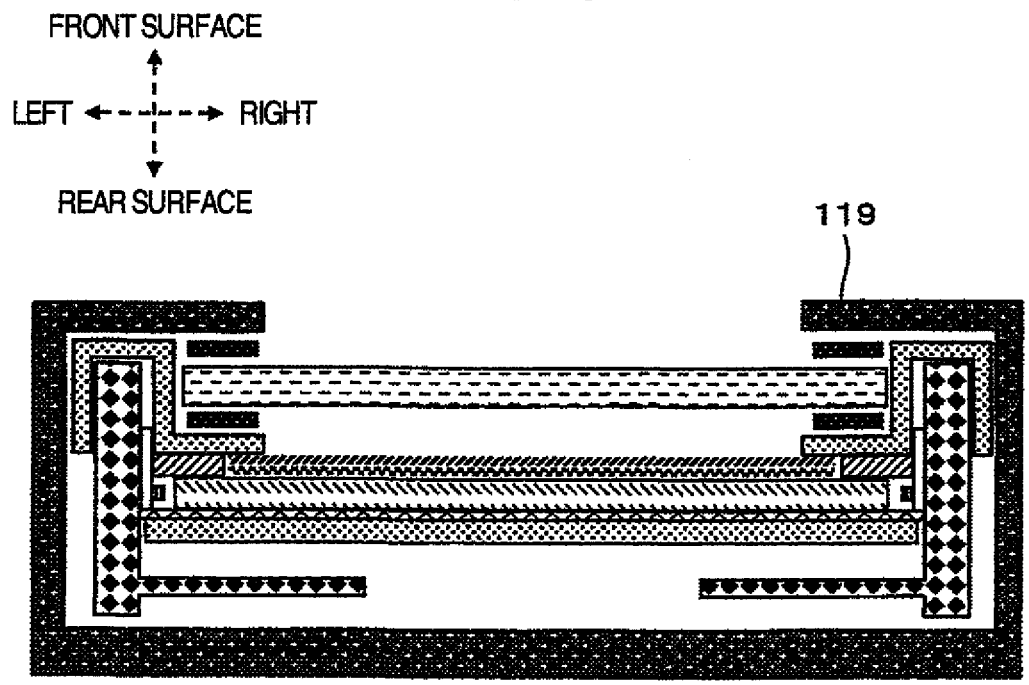
FIG. 8 is a cross-sectional view illustrating another configuration in which the liquid crystal display device according to the first embodiment of the present invention is applied to a video display device.

FIG. 7 is a view illustrating a configuration in which the liquid crystal display device according to the present embodiment is applied to the video display device. The liquid crystal display device is supported by the housing 119. In addition, as shown in FIG. 8, the housing 119 is used as the first frame and the second framed at the same time. That is, the housing 119 serves as the first frame and the second frame at the same time, so that it is possible to provide the liquid crystal display device made thin further more.

Second Embodiment

Figure 9:
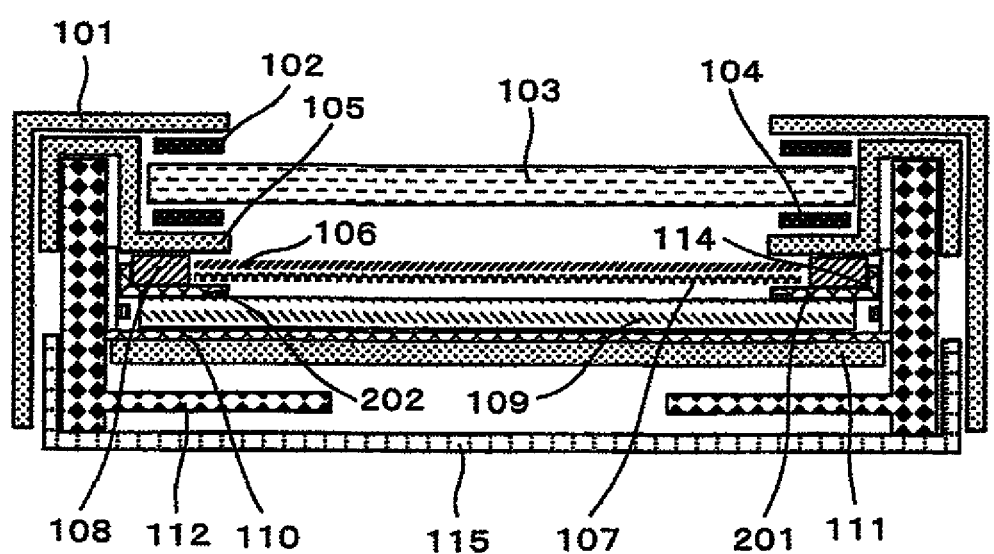
FIG. 9 is a cross-sectional view corresponding to FIG. 2, illustrating a configuration according to a second embodiment of the present invention.
Figure 10:
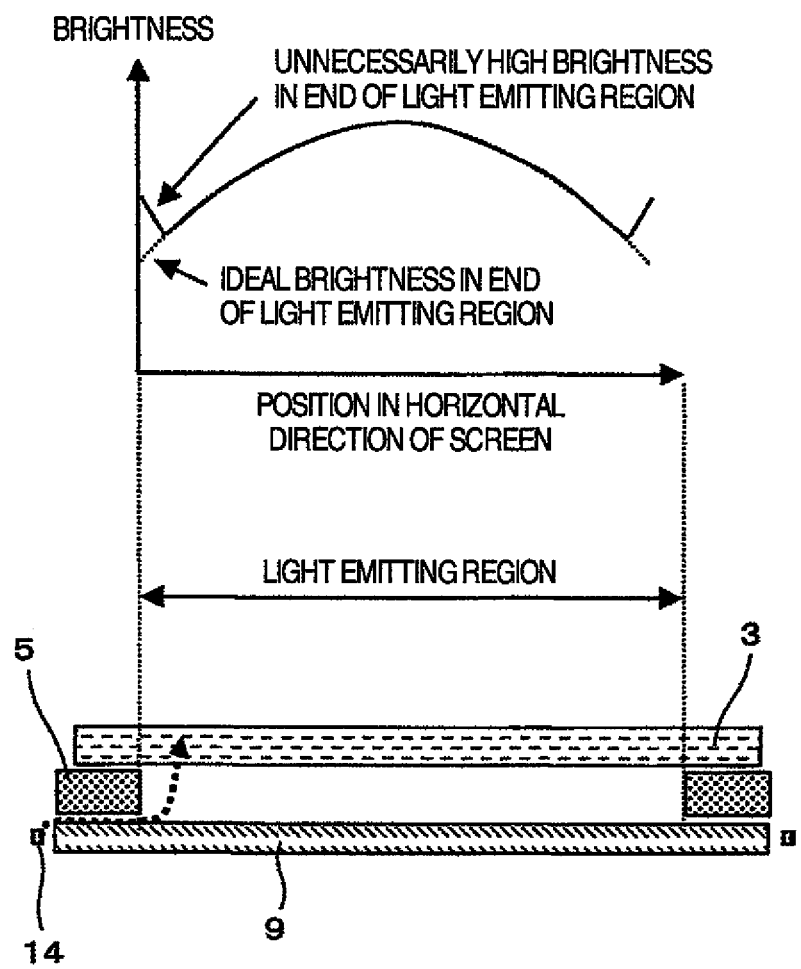
FIG. 10 is a cross-sectional view illustrating a configuration of a conventional liquid crystal display device.
Figure 10:
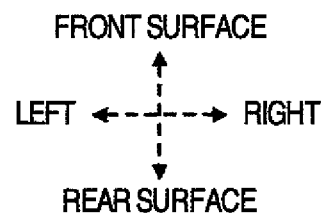
Figure 11:
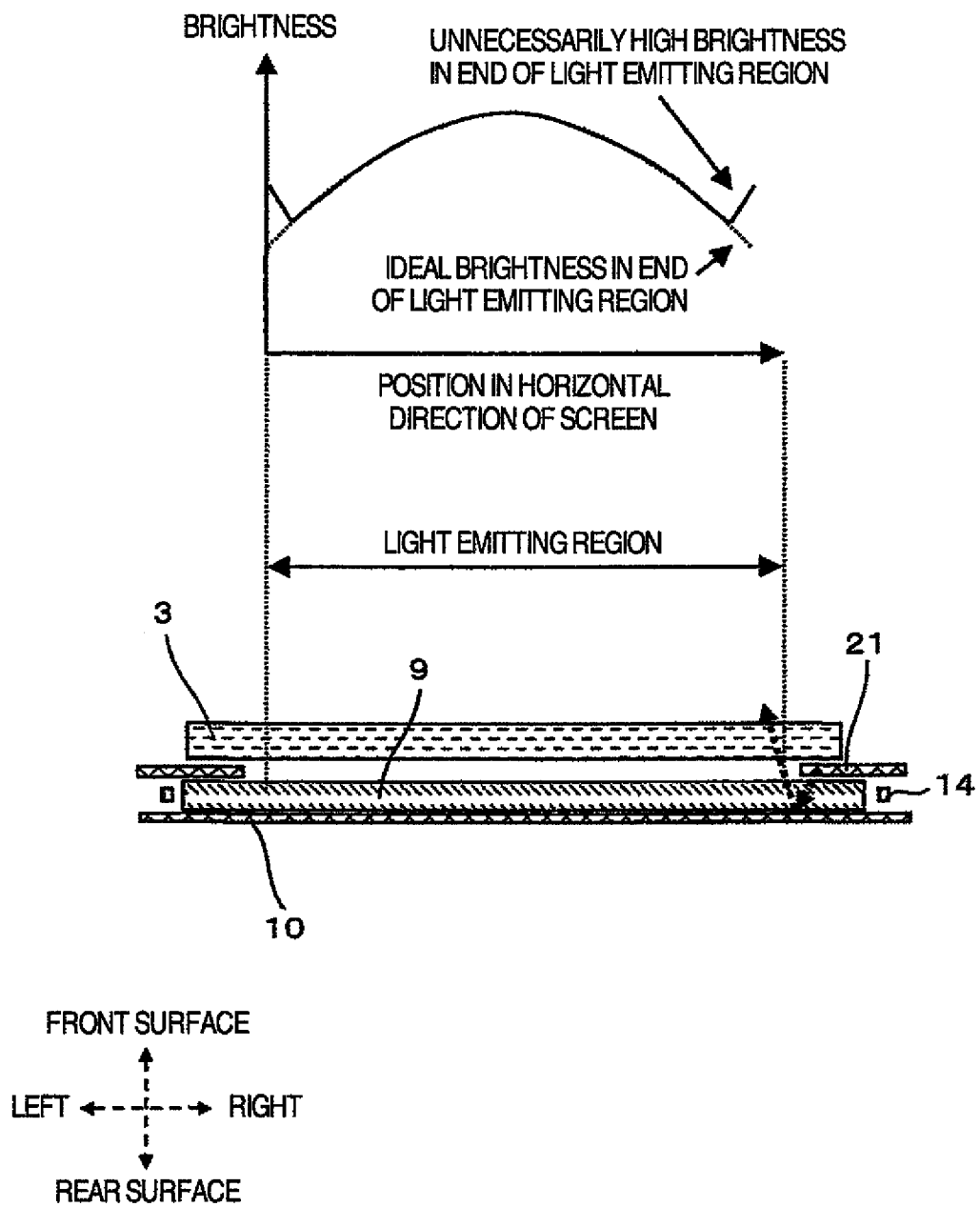
FIG. 11 is a cross-sectional view illustrating a configuration of another conventional liquid crystal display device.

A second embodiment according to the present invention will be described in detail with reference to FIG. 9.

Except a portion where the upper reflection sheet 201 is disposed between the cushion member 108 and the light guide plate 109, the present embodiment is substantially equal to the first embodiment. Since the cushion member 108 is made of an elastic material, the gap between the light guide plate 109 and the upper reflection sheet 201 is not opened, so that it is possible to prevent the light from leakage. For example, such a cushion member 108 includes (1) the acrylate resin material of which the carbon number of the side chain is four or more, (2) a material which is made by adding a plasticizer made of dibutyl phthalate or the like to the acrylate resin having one to three of the carbon number of the side chain, or (3) a chloroprene rubber, a silicon rubber, or fluorine series rubber which are excellent in the heat resistance and the weather resistance.

The upper reflection sheet 201 serves to reflect and enter the light, which is emitted from the light source 114 and is not incident into the light guide plate 109, to the light guide plate 109. Since the reflection ratio of the upper reflection sheet 201 is high up to 90% or more, it is possible to reduce the loss of light. In addition, the upper reflection sheet 201 serves to return the light emitted from a light emitting surface of the light guide plate 109 in the vicinity of the light source 114 to the light guide plate 109 again. In the vicinity of the light source 114, the light emitted from the light source becomes irregular, this portion of which cannot be used as the display surface. Here, by returning the light in the vicinity of the light source 114 to the light guide plate 109 by using the upper reflection sheet 201, the loss of light can be reduced.

A light absorption layer 202 is provided between the upper reflection sheet 201 and the light guide plate 109. With the light absorption layer, it is possible to suppress the light from being scattered and reflected at this portion, so that it is possible to improve the phenomenon that the brightness is increased unnecessarily in the end of the light emitting region. In order to prevent the brightness from being increased unnecessarily in the end of the light emitting region, it is preferable that the light absorption ratio of the light absorption layer 202 is high up to 80% or more, and the black sheet may be used. By setting a width of the light absorption layer 202 in the horizontal direction to about 4 mm from the end of the upper reflection sheet 201 in consideration of the thickness of the light guide plate 109 and the reflection angle of the light, it is possible to prevent the light from being scattered and reflected. In this case, if the light absorption layer 202 exists in a region where the light absorption layer 202 is not to be superposed with the light guide plate 109, that is, if the light absorption layer exists in a space in the vicinity of the light source, the light from the light source 114 is absorbed into the light absorption layer 202. Therefore, the light absorption layer 202 is preferably disposed on the region where the light absorption layer 202 is to be superposed with the light guide plate 109. In addition, without providing the light absorption layer 202, black ink is printed on the surface of the upper reflection sheet 201 at the side where the light guide plate 109 exists, and thereby being able to improve the phenomenon that the brightness is increased unnecessarily in the end of the light emitting region.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video display device comprising:
   a liquid crystal display device; and
   a housing configured to support said liquid crystal display device,
   wherein said liquid crystal display device includes
   a liquid crystal panel,
   a first frame and a liquid crystal support member which interpose said liquid crystal panel therebetween,
   a light guide plate which is disposed at said liquid crystal support member on a side opposite to a side where said liquid crystal panel is disposed, and
   a light source which is disposed at a side surface of said light guide plate,
   wherein a cushion member is disposed between said liquid crystal support member and said light guide plate so as to enable contact of said cushion member with said liquid crystal support member and with said light guide plate, and
   wherein said cushion member has a reflection ratio of at least 80%.

2. The video display device according to claim 1, wherein said cushion member serves to suppress light emitted from between said liquid crystal support member and said light guide plate.

3. The video display device according to claim 1, wherein said light source is mounted on a light source mounting substrate, and
   wherein said cushion member comes into contact with said light source mounting substrate.

4. The video display device according to claim 1, wherein said cushion member is formed of a white resin.

5. The video display device according to claim 1, wherein said cushion member is formed of a hydrocarbon series porous resin.

6. The video display device according to claim 1, wherein a surface of said cushion member, on which said light guide plate is disposed, is formed in an irregular shape.

7. A liquid crystal device comprising:
   a liquid crystal panel,
   a first frame and a liquid crystal support member which interpose said liquid crystal panel therebetween,
   a light guide plate which is disposed at said liquid crystal support member on a side opposite to a side where said liquid crystal panel is disposed, and
   a light source which is disposed at a side surface of said light guide plate, and
   a cushion member which is disposed between said liquid crystal support member and said light guide plate so as to enable contact of said cushion member with said liquid crystal support member and with said light guide plate,
   wherein said cushion member has a reflection ratio of at least 80%.

8. The liquid crystal device according to claim 7,
wherein said light source is mounted on a light source mounting substrate, and
wherein said cushion member comes into contact with said light source mounting substrate.

* * * * *